(12) United States Patent
Ravishankar et al.

(10) Patent No.: US 6,440,209 B1
(45) Date of Patent: Aug. 27, 2002

(54) COMPOSITE PIGMENTS COMPRISING IN-SITU PRECIPITATED METAL CARBONATE CRYSTALS

(75) Inventors: S. A. Ravishankar; Ernest M. Finch, both of Macon, GA (US); Richard R. Berube, Holmdel, NJ (US)

(73) Assignee: Engelhard Corpoartion, Iselin, NJ (US)

( * ) Notice: Subject to any disclaimer, the term of this patent is extended or adjusted under 35 U.S.C. 154(b) by 0 days.

(21) Appl. No.: 09/501,527

(22) Filed: Feb. 9, 2000

(51) Int. Cl.[7] .............................. C09C 1/02; C09C 1/36; C09C 1/42; C09C 3/06
(52) U.S. Cl. ...................... 106/463; 106/464; 106/466; 106/468; 106/467; 106/486; 428/403; 423/430
(58) Field of Search ................................ 106/416, 466, 106/464, 486, 463, 468, 467; 428/403; 427/215, 218; 423/430

(56) References Cited

U.S. PATENT DOCUMENTS

| | | | |
|---|---|---|---|
| 3,320,026 A | 5/1967 | Waldeck ........................ 23/66 |
| 3,669,620 A | 6/1972 | Bennett et al. ................. 23/66 |
| 4,018,877 A | 4/1977 | Woode ....................... 423/432 |
| 4,133,894 A | 1/1979 | Shibazaki ................... 423/432 |
| 4,157,379 A | 6/1979 | Takitani et al. ............. 423/430 |
| 4,237,147 A | 12/1980 | Merten et al. ............... 426/590 |
| 4,244,933 A | 1/1981 | Shibazaki et al. .......... 423/432 |
| 4,367,207 A | 1/1983 | Vanderheiden .............. 423/432 |
| 4,714,603 A | 12/1987 | Vanderheiden .............. 423/430 |
| 4,927,618 A | 5/1990 | Mathur et al. .............. 423/432 |
| 4,980,395 A | 12/1990 | Mathur et al. .............. 523/200 |
| 5,043,017 A | 8/1991 | Passaretti .................... 106/465 |
| 5,082,887 A * | 1/1992 | Brown et al. ................ 524/413 |
| 5,156,719 A | 10/1992 | Passaretti .................... 162/158 |
| 5,215,734 A | 6/1993 | Kunesh ....................... 423/430 |
| 5,232,678 A | 8/1993 | Bleakley et al. ............ 423/432 |
| 5,296,002 A | 3/1994 | Passaretti ..................... 23/304 |
| 5,332,564 A | 7/1994 | Chapnerkar et al. ........ 423/432 |
| 5,342,600 A | 8/1994 | Bleakley et al. ............ 423/432 |
| 5,376,343 A | 12/1994 | Fouche ........................ 423/165 |
| 5,558,850 A | 9/1996 | Bleakley ..................... 423/432 |
| 5,643,415 A | 7/1997 | Wise .......................... 162/181 |
| 5,695,733 A | 12/1997 | Kroc et al. .................. 423/432 |
| 5,741,471 A | 4/1998 | Deutsch et al. ............. 423/432 |
| 6,143,064 A * | 11/2000 | Virtanen ..................... 106/449 |

FOREIGN PATENT DOCUMENTS

WO    WO 97/32934    9/1997

* cited by examiner

Primary Examiner—Michael Marcheschi
(74) Attorney, Agent, or Firm—Stephen I. Miller

(57) ABSTRACT

Composite pigments comprising particles of silicate or oxide minerals having deposited thereon a multiplicity of particles of a metal carbonate as a result of in-situ precipitation.

13 Claims, 2 Drawing Sheets

COMPOSITE PIGMENTS COMPRISING IN-SITU PRECIPITATED METAL CARBONATE CRYSTALS

FIELD OF THE INVENTION

Figure 1:
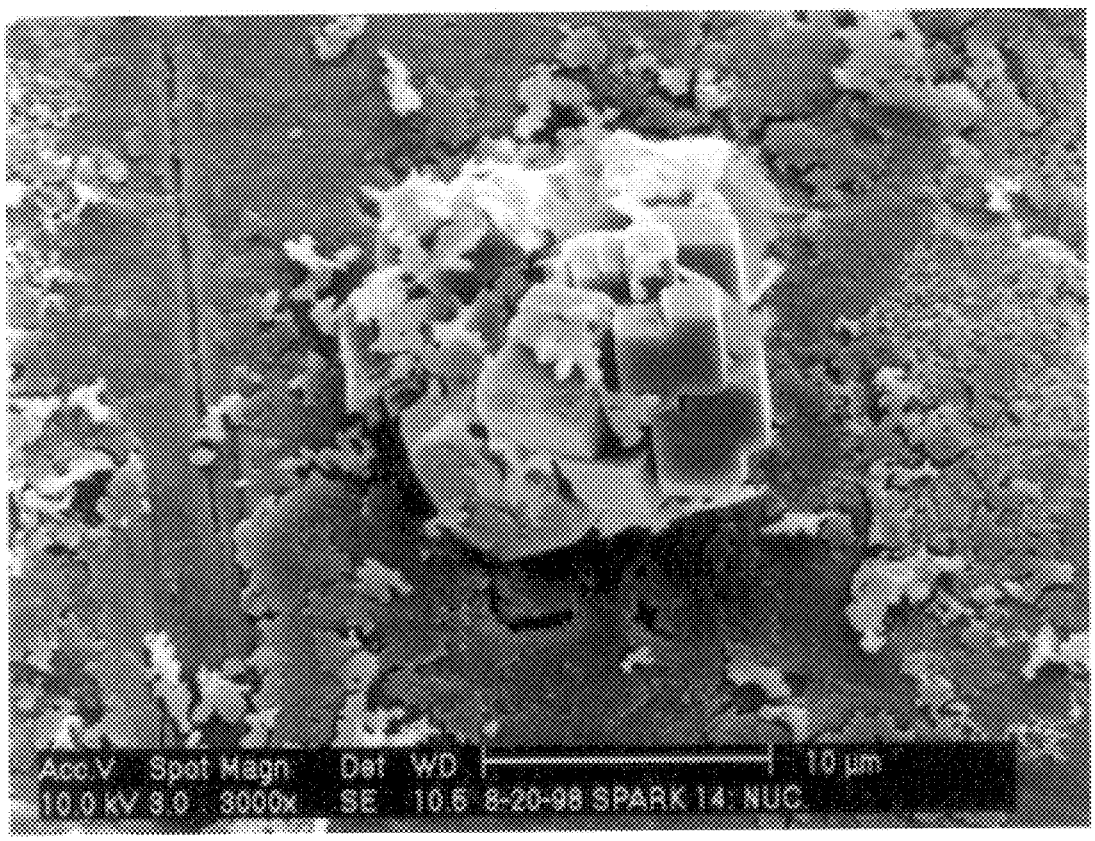

The invention relates to composite pigments comprising carbonate crystals precipitated in the presence of and chemically bonded to a pigment substrate. The invention, in especially preferred embodiment comprises novel hybrid white pigments in which individual anionically charged silicate mineral pigment particles, preferably hydrous kaolin, serve as a substrate for crystals of an alkaline earth metal carbonate precipitated on the surface of the anionically charged mineral pigment particles and adherent thereto.

BACKGROUND OF THE INVENTION

White pigments such as hydrous and calcined kaolin, chemically bulked kaolin, precipitated and naturally occurring calcium carbonate, titania, mica, talc, alumina and silica are widely used to coat or fill paper goods, in paints, plastics, rubber goods and the like. Much research and development effort has been expended to enhance the performance properties of these pigments. In some cases, this has involved blending pigments to achieve benefits not realized using single pigments.

An obvious extension to the efforts provide such pigments has been to affix particles of one class of pigments to particles of a different class of pigments in preference to using "loose blends". As an example, coflocculation has been advocated. Another example is described in WO 97/32934.

Other efforts have been directed to surface coating minerals particles with inorganic gels or mixed gels.

For many years, specially processed kaolin clays were minerals the most widely used by the paper industry, one of the largest consumers of white pigments. The kaolin, in hydrous and calcined form, was used to coat paper (and board) as well as to fill paper goods. In recent years, precipitated calcium carbonate (PCC) has replaced kaolin in some of those applications, especially paper filling, in which neutral or alkaline conditions can be employed. In the past, paper filling was conducted exclusively at acidic conditions that were feasible using clay. However, recently, PCC is finding increasing use by the paper industry. Nevertheless, under acid papermaking conditions, the use of PCC is still under scrutiny owing to the decomposition of PCC to calcium ions and carbon dioxide gas. But, PCC has the advantages of forming different crystal forms to achieve a variety of end properties on paper.

| | | | | | |
|---|---|---|---|---|---|
| 3,320,026 | 3,669,620 | 4,018,877 | 5,156,719 | 4,237,147 | 5,558,850 |
| 4,927,618 | 5,043,017 | 4,367,207 | 4,980,395 | 5,342,600 | 4,714,603 |
| 5,232,678 | 5,695,733 | 4,133,894 | 5,741,471 | 4,244,933 | 5,332,564 |
| 4,157,379 | 5,215,734 | 5,643,415 | 5,296,002 | 5,376,343 | |

SUMMARY OF THE INVENTION

The present invention provide novel composite inorganic pigment comprising (a) a substrate composed of individual particles of a silicate and/or oxide mineral and (b) an adherent surface coating comprising a multiplicity of crystals of a metal carbonate precipitated in-situ and chemically bonded to surfaces of the substance. The present invention also provides a method for making such pigments involving pH control and the initial addition of the source of (b) in the presence of water to (a) in a manner such that the source of (b) is adsorbed on the surface of (a). Thereafter, precipitation of the adsorbed source of ions is carried out by pH adjustment. The sequence of adsorption and precipitation may be repeated one or more times.

In especially preferred embodiment, a alkaline source of calcium ions is adsorbed on the surfaces of the negatively charged platy particles of kaolin clay (hydrous and calcined) clay and pH is decreased by adding carbon dioxide to the resulting aqueous slurry of kaolin with adsorbed calcium ions. A family of hybrid pigments containing both a negatively charged component (kaolin) and positively component (PCC) is obtained. Since the amount of calcium that can be adsorbed is limited by the tendency of polyvalent cations to flocculate and thicken the clay slurry, in a presently preferred embodiment, the sequence is usually repeated one or more times to provide an adequate coating of PCC crystals. It is noted that the PCC content far exceeds that achievable when the quantity of calcium introduced is limited to that obtained when relying on ion exchange.

An unexpected benefit observed when conducting experimental tests directed to making kaolin/PCC hybrids was that the processing desirably limited the content of ultrafines and slimes in the feed kaolin without necessitating physical removal of slimes. In other words, the ultrafines are physically present but particle size distribution is engineered to contain less fines by enlargement as a result of practicing the process of the subject invention technology. It is well known that removal of fines or slimes from the kaolin pigments is beneficial and, in some cases, necessary to achieve optimum optical and Theological properties of the kaolin based fillers and coating products.

Figure 2:
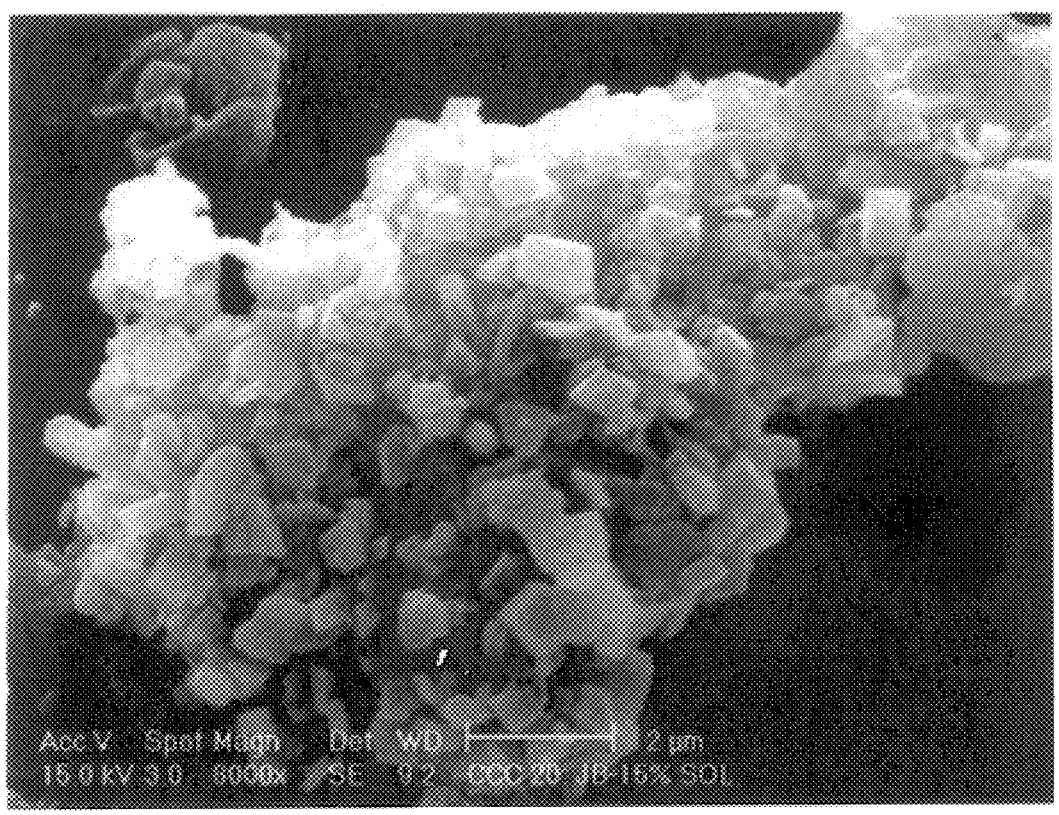

Several prior art references disclose bulking or chemical structuring of kaolin particles where the fines and slimes are preferentially bound with the help of binding agents, usually a cationic polyelectrolyte, without removing them. However, a surprising and salient aspect of the present technology is the ability to engineer the particle size distribution of the end product without actually removing the fines and ultrafines. For example, the Electron micrographs shown in FIGS. 1 and 2 illustrate the particle size enlargement of NUCLAY® kaolin particles by practice of this invention.

The extent of precipitation can be such that it varies from partial coverage of the kaolin surface (in patches) to complete encapsulation of calcium carbonate on kaolin, depending upon the desired particle size distribution and optical properties.

The invention in preferred embodiment provides value added kaolin based composite pigments of kaolin with precipitated calcium carbonate (PCC) that exhibit unique pigment characteristics and in some cases, a synergistic advantage over loose blend of kaolin and PCC in end applications such as coating and filling paper.

In the present invention, the calcium carbonate phase is grown in-situ on the kaolin surface for engineering particle size distribution and managing surface morphology. The resulting composite kaolin calcium carbonate pigment surprisingly showed extremely low amount of fines indicating strong bulking tendencies of fines of the kaolin substrate.

In the Drawings, FIG. 1 is the scanning electron micrograph (SEM) of a typical particle of a commercial delaminated kaolin (NUCLAY® pigment) coated with PCC by the practice of this invention. Note that the average size of the PCC (prismatic form) for this product is roughly 2 $\mu$m.

FIG. 2 is the scanning electron micrograph (SEM) of a typical particle of a commercial delaminated kaolin (NUCLAY® pigment) coated with PCC by the practice of this invention. Note that the average size of the PCC (prismatic form) in this product is roughly 0.5–0.7 µm.

DETAILED DESCRIPTION OF THE PREFERRED EMBODIMENTS

The substrate pigments can be aluminosilicates such as kaolin that are produced by conventional water wash or air float processes with particle size below 40 microns, preferably below 5 microns, and most preferably below 2 microns. The pH of the slurry can be in the range of 6–11 although it is preferred to have the slurry in 6–9 pH range. The specific substrate kaolin is chosen depending upon the final brightness and particle size distribution of the hybrid pigment. Examples of kaolin pigments include NUCLAY® and MIRAGLOSS® products etc. Typically, average size of the substrate pigment is in the range of 0.3 to 2 microns, e.s.d.

The kaolin slurry can be prepared either from spray dried product or spray dryer feed and may be diluted to 15–25% solids, preferably in 18–22% solids range. No dispersant is necessary at this point because of the low solids. However, addition of a conventional anionic clay dispersant is well within the scope of practicing the invention.

Calcium hydroxide slurry may be prepared at 20% solids from dry $Ca(OH)_2$ powder in a WARING BLENDOR mixer. An alternate source of Ca(OH)2 can be from calcium oxide. Normally, for economic reasons, the calcium hydroxide is produced from calcium oxide which in turn is produced by calcining ground and naturally available calcium carbonate. The calcination of calcium carbonate produces calcium oxide and carbon dioxide as the decomposition products.

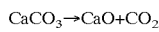
$$CaCO_3 \rightarrow CaO+CO_2$$

While calcium oxide is slaked to produce calcium hydroxide, the carbon dioxide is used in the carbonation step to produce PCC as will be explained later.

Generally the amount of carbonate crystals precipitated in situ is in the range of 5% to 65%, preferably 5% to 55%, based on the total weight of the composite pigment.

Typically, to produce a 1000 gms batch of the kaolin-PCC hybrid pigment with 20% of calcium carbonate precipitate coating, 800 dry grams of kaolin at 20% solids are placed in a reaction vessel. In a separate tank, 112 gms of calcium oxide is mixed with 638 ml of water. The calcium oxide is added slowly while mixing since CaO exothermically reacts with water to form $Ca(OH)_2$ according to the following well-known reaction,

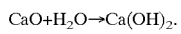
$$CaO+H_2O \rightarrow Ca(OH)_2.$$

At this stage, it is possible to control the temperature of the reaction and add chemical additives to control the crystal structure of the PCC formed on to kaolin surface.

The term "SPARK", as used hereinafter, refers to the technology of this invention and is an acronym for Surface Precipitation and ARchitecture of Kaolin. The central concept of this technology is a kaolin calcium carbonate copigment obtained by precipitating calcium carbonate insitu on a kaolin surface. The extent of precipitation can be such that it varies from partial coverage in patches to complete encapsulation of calcium carbonate on kaolin depending upon the desired particle size distribution and optical properties.

The pigments can be made in various systems, for example, a flotation cell with agitation and a gas sparging system for $CO_2$ gas. The substrate kaolin is chosen depending upon the final copigment's brightness and particle size distribution. The SPARK technology results in coarsening the particle size of the feed kaolin and improving the pigment brightness in some cases. To illustrate the method, NUCLAY®, a delaminated kaolin, was selected as a model substrate to coat prismatic calcium carbonate crystal structure.

EXAMPLE 1

A slurry of NUCLAY® delaminated kaolin was prepared from spray dryer feed in a commercial plant and was diluted to 20% solids. Calcium hydroxide slurry was prepared at 20% solids from its dry form. Typically, for a 20% of calcium carbonate coating, roughly 800 dry grams of NUCLAY® at 20% solids were taken in a reaction vessel with proper temperature control. About 150 gms $Ca(OH)_2$ was added to 600 ml of water. Normally, for economic reasons, CaO is preferred in which case 112 gms will have to be mixed with 638 ml of water. Initially, the water was added slowly and CaO exothermically reacted with water to form $Ca(OH)_2$ according to the following well-known reaction.

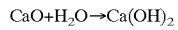
$$CaO+H_2O \rightarrow Ca(OH)_2$$

This process is called 'slaking' and an appropriate control of temperature and slaking time translate into crystal structure, shape and size of the calcium carbonate formed on the kaolin. U.S. Pat. No. 5, 558,850 and the references therein explain some of the commonly practiced method of growing different shapes of PCC crystals.

After preparing the $Ca(OH)_2$ and kaolin slurry, the $Ca(OH)_2$ slurry was added slowly to NUCLAY® slurry under constant agitation. The pH of the slurry increased to about 11 and the slurry became increasingly viscous. The reason for the slurry to become increasingly viscous is because of the coagulation of kaolin by Ca++ and Ca(OH)+ ions. This step ensures that the calcium ions is actually adsorbing on to the kaolin surface. At this point, the addition of $Ca(OH)_2$ slurry was stopped and $CO_2$ gas was sparged through the NUCLAY® slurry to convert $Ca(OH)_2$ to $CaCO_3$.

$$Ca(OH)_2+CO_2 \rightarrow CaCO_3,$$

This is called the 'carbonation' step. The control of temperature is a critical factor to achieve the desired crystal structure, size and shape of calcium carbonate on kaolin. Also important is the chemical additions for the control of crystal structures. On continuous passage of carbon dioxide, the calcium carbonate formation occurs on the kaolin surface and at the same time the pH drops to about 6.5–7. At this stage, the next portion of calcium hydroxide was added and kaolin slurry was once again subjected to the pH shock and carbonation.

After adding the desired quantities of calcium hydroxide to achieve the PCC coverage for the desired improvement in brightness and the particle size distribution of the hybrid product, the carbonation reaction was stopped. The product was then filtered, washed with copious quantities of water and dried in an oven at 80–100 C. Alternatively, one can spray dry the slurry to obtain a dry hybrid pigment.

In preliminary work with NUCLAY® kaolin, three different levels of coatings were achieved from 20, 25 to 30 wt (dry wt basis) percent. The product were analyzed by XRD and well-defined peaks were identified corresponding to prismatic form of calcite. The particle size distribution (PSD) and surface area data indicated the expected trend. However the brightness values did not increase significantly from that of NUCLAY®. Shown in Table 1 are the brightness, PSD and Surface area data (BET) on the different SPARK products.

TABLE 1

PCC coated NUCLAY ®

| Sample | GEB | Mass finer than % | | | | Surface Area m²/gm |
|---|---|---|---|---|---|---|
| | | −2 microns | −1 micron | −0.5 micron | −0.2 micron | |
| NUCLAY ® Control | 87.6 | 80 | 65 | 44 | 17 | 13.91 |
| NUCLAY ® w/20% PCC coating | 87.7 | 61 | 45 | 27 | 8 | 12.24 |
| NUCLAY ® w/25% PCC coating | 87.8 | 61 | 38 | 19 | 4 | 11.38 |
| NUCLAY ® w/30% PCC coating | 87.9 | 63 | 36 | 16 | 4 | 10.2 |

After working with NUCLAY®, delaminated kaolin, it was found that although the pH and temperature cycles or shocks during the precipitation process cause dissolution or leaching of aluminum and silica ions from the kaolin, this does not detrimentally affect the targeted calcium carbonate crystal structure. However, there was difficulty in achieving aragonite crystal structure when carrying out a limited number of test runs.

EXAMPLE 2

Tests were carried out using MIRAGLOSS® 91 pigment. This is a commercial ultrafine grade of purified hydrous kaolin that, prior to processing through SPARK process is about 100% finer than 1 micron and is supplied in spray dried form or slurry form with low molecular weight polyacrylate (Colloid 211) as dispersant at pH 6–7. The average particle size is roughly 0.22 micron. This is not considered as an opacifying pigment in the convention sense because of the ultrafine particle size. Therefore one of the objective of this test was to determine whether the MIRAGLOSS® 91 could be converted to an opacifying pigment with properties comparable to the ANSILEX® 93 calcined kaolin pigment.

In the tests using MIRAGLOSS® 91 pigment, 300 dry gms of the pigment was slurried into 15% solids. Also prepared was the Ca(OH)2 slurry (lime) at 15% solids by mixing 148 dry gms in 838.6 gms of water. The kaolin slurry was transferred to the reaction vessel attached with sparger and lime was added slowly until the pH of the kaolin-lime slurry reached about pH 11. At this stage the carbonation reaction was carried out until the pH dropped to 6.5–7. Once again, Ca(OH)2 was added followed by carbonation reaction and these steps were repeated until the desired coverage/amount of calcium carbonate was precipitated on the kaolin surface. The resulting hybrid pigment slurry was maintained at pH 7–8, filtered and the filter cake was dried in an oven. Alternatively, one can spray dry the hybrid product slurry.

Table 2 compares the particle size distribution of a sample containing 40% (by weight) calcium carbonate coating on MIRAGLOSS® 91 vs 50/50 blend of MIRAGLOSS® 91 and PCC. The PCC component in the blend was produced under conditions similar to those used in preparing the composite pigment but without using the kaolin component during the carbonation step.

TABLE 2

Desliming Effect

| Pigment | Particle Size distribution (% Mass Finer) | | | |
|---|---|---|---|---|
| | −2.0 μm | −1.0 μm | −0.5 μm | −0.2 μm |
| MIRAGLOSS ® 91 | 98.8 | 97.9 | 89.4 | 43.7 |
| 40/60 Blend of PCC and Kaolin | 76.8 | 57.1 | 40.3 | 20.6 |
| Hybrid Pigment with 40% coating | 70.5 | 51.3 | 18.2 | 4.9 |

The sample made by the aforementioned procedure, which is MIRAGLOSS® 91 coated with 40% of calcium carbonate has 50.3% of particles in the size interval between 2 and 0.7 pm and ANSILEX® 93 has about 49%. The GE brightness was equal at 92.2. The surface area of MIRAGLOSS® 91 decreased from 19.5 to 10 Sq.M/gm which is comparable to that of calcined clay. This suggests that it possible to produce a hydrous and less abrasive hybrid pigment that can be substituted for calcined kaolin in paper coating and filling application. Further, it is possible to incorporate high refractive index oxides such as titania and zirconia with the kaolin substrate to create composite hybrid pigments using SPARK technology.

EXAMPLE 3

Subsequent to tests using NUCLAY® and MIRAGLOSS® 91, hydrous kaolin pigment substrates, more tests were conducted using ANSILEX® 93. ANSILEX® 93 is a calcined kaolin and calcined kaolin has relatively cleaner surface compared to hydrous kaolin. The purpose was to check the advantage of having a cleaner surface as a substrate in achieving the desired crystal structure of PCC. There was no apparent advantage in spite of fact that the precipitation reaction progressed in the same way as hydrous kaolin.

EXAMPLE 4

Another method of practicing this invention is to add a kaolin slurry at 10–20% solids to calcium hydroxide at 10–20% solids. The incorporation of kaolin slurry in calcium hydroxide solution is carried out under constant agitation slowly to avoid flocculation. The kaolin slurry can be anionically or cationically dispersed or it could be an acid flocced filter cake available in regular kaolin processing. After adding a sufficient quantity of kaolin slurry to yield a manageable fluidity of 2500–3000 cps viscosity, the slurry is then subjected to a carbonation step to convert the calcium hydroxide to precipitated calcium carbonate in the presence of kaolin. The slurry is then filtered and dried.

In the specification and claims all the particle sizes other than those measured using SEM were obtained by conventional sedimentation technology using the SEDIGRAPH® 5100 instrument. Conventional testing used by the paper industry was employed in evaluating products.

While this invention has been described with emphasis on preferred embodiment it would be understood that variants of principles of the invention can be practiced within the scope of the invention. For example, the technology can be practiced to coat titania, talc, alumina, silica, various oxides and silicate minerals and the mixture thereof with various precipitated carbonates such as magnesium, mixtures of calcium and magnesium, barium, rare earths, transitions metal carbonates etc.

We claim:

1. A composite pigment consisting essentially of particles of an oxide or silicate mineral as a substrate and precipitated directly on the surface of said particles and chemically bonded to said surface a multiplicity of positively charged crystals of polyvalent metal carbonate.

2. The pigment of claim 1 wherein said polyvalent metal is at least one alkaline earth.

3. The pigment of claim 1 wherein said polyvalent metal consists of calcium.

4. The pigment of claim 1 wherein said mineral is a clay.

5. The pigment of claim 1 wherein said mineral is hydrous or calcined kaolin clay.

6. The pigment of claim 5 wherein said mineral has an average particle size in the range of 0.3 to 2.0 µm.

7. The pigment of claim 1 wherein said positively charged crystals are present as a non-continuous deposit protruding from the surface of the said substrate.

8. The pigment of claim 1 wherein said positively charged crystals are present as a continuous layer protruding from the surface of said substrate.

9. The pigment of claim 1 wherein said positively charged crystals are present in amount with the range of 1 to 65% based on the total weight of said composite pigment.

10. The pigment of claim 1 wherein said positively charged crystals are present in amount with the range of 5 to 55% based on the total weight of said composite pigment.

11. A composite pigment consisting essentially of platy particles having an average size in the range of 0.3 to 2.0 µm of hydrous kaolin clay and precipitated directly on the surface thereof and chemically bonded thereto from 5 to 55% based on the total weight of said composite pigment of crystalline calcium carbonate, magnesium carbonate or a mixture of calcium and magnesium carbonate.

12. The composite pigment of claim 11 wherein the GE brightness of said composite pigment, is at least 85%.

13. The composite pigment of claim 11 wherein the GE brightness of said composite pigment, is at least 90%.

* * * * *